Dec. 11, 1951  R. AUBREY, JR., ET AL  2,578,031
APPARATUS FOR TRANSVERSELY TESTING CYLINDRICAL MEMBERS
Filed Nov. 30, 1946  2 SHEETS—SHEET 1

INVENTOR
Richard Aubrey, Jr. and
Alfred A. Chambers
by their attorneys
Stebbins, Blenko & Webb Dec. 11, 1951     R. AUBREY, JR., ET AL     2,578,031
APPARATUS FOR TRANSVERSELY TESTING CYLINDRICAL MEMBERS
Filed Nov. 30, 1946     2 SHEETS—SHEET 2
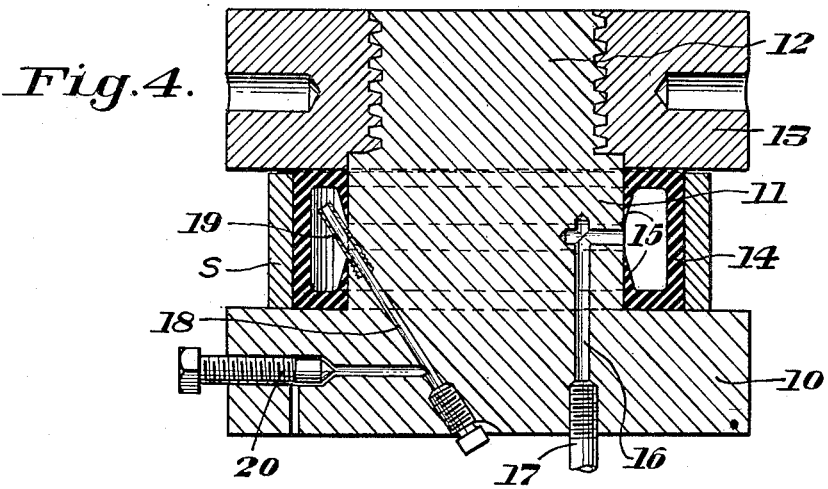
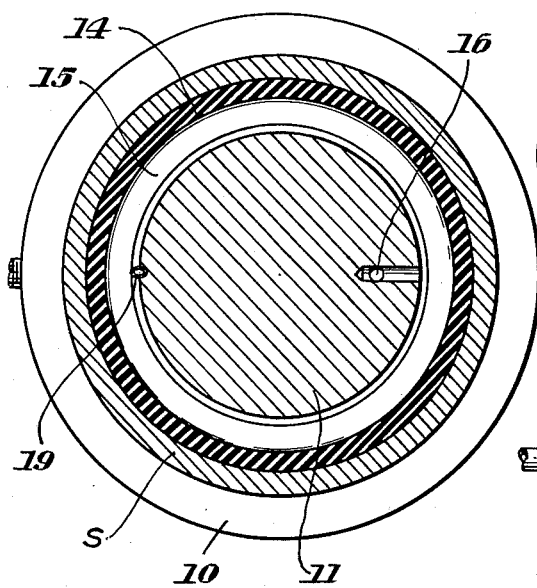
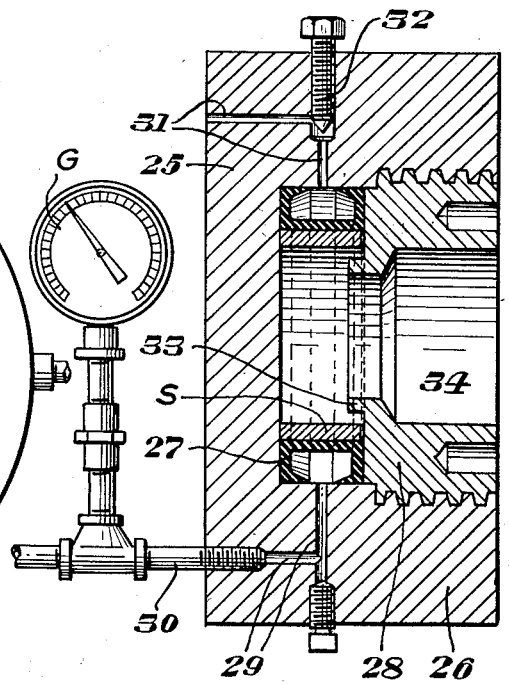
INVENTOR
Richard Aubrey, Jr. and
Alfred A. Chambers
by their attorneys
Stebbins, Blenko & Webb

UNITED STATES PATENT OFFICE 2,578,031

APPARATUS FOR TRANSVERSELY TESTING CYLINDRICAL MEMBERS

Richard Aubrey, Jr., Boardman Township, Mahoning County, and Alfred Allen Chambers, Youngstown, Ohio, assignors to The Youngstown Sheet & Tube Company, Youngstown, Ohio, a corporation of Ohio Application November 30, 1946, Serial No. 713,210

10 Claims. (Cl. 73—88)

This invention relates generally to the art of testing and, in particular, to an apparatus for testing pipe transversely or circumferentially.

Pipe has usually been tested heretofore by cutting longitudinal and circumferential test coupons therefrom and pulling them in a testing machine. This procedure is quite satisfactory for the longitudinal coupons but the circumferential coupons, being curved as cut from the pipe, require straightening before pulling. The cold work incident to straightening changes the physical properties of the specimen so that the results of a tension test are not entirely reliable. Tension tests on circumferential coupons indicate a yield strength different from that actually possessed by the pipe in its original form. This error is particularly serious because relatively few pipe failures result from longitudinal stress. Thus the values for longitudinal mechanical properties do not have much significance as to the serviceability of the pipe in the field. The transverse mechanical properties are, therefore, highly important.

We have invented an apparatus for subjecting ring-like or annular specimens such as short sections cut from a length of pipe, to circumferential stress, either tensile or compressive, in their original condition, thus making it possible to obtain true values for the transverse mechanical properties of the pipe. In a preferred embodiment, we provide a cylindrical support having an expansible annulus associated therewith adapted to engage a specimen ring around the entire circumference thereof, and means for supplying fluid under pressure to the annulus to stress the specimen circumferentially. For the purpose of tensile tests, the apparatus preferably comprises a cylindrical block having an expansible annulus therearound adapted to receive the specimen in telescoped relation thereover. For compression testing, we provide a cylinder having an expansible annulus extending around inside thereof, adapted to accommodate the specimen in telescoped relation within it. In either case, our method includes the assembly of the specimen ring with the expansible annulus and its support in telescoped relation, after which fluid under pressure is admitted to the annulus to stretch or collapse the specimen.

A complete understanding of the invention may be obtained from the following detailed description which refers to the accompanying drawings illustrating preferred embodiments for tension and compression tests. In the drawings, Figure 1 is a plan view of apparatus for tension testing;

Figure 4 is a vertical transverse sectional view taken along the plane of line IV—IV of Figure 1;

Figure 5 is a horizontal sectional view taken along the plane of line V—V of Figure 2; and Figure 6 is a view similar to Figure 4 showing apparatus for compression testing.

Figure 1:
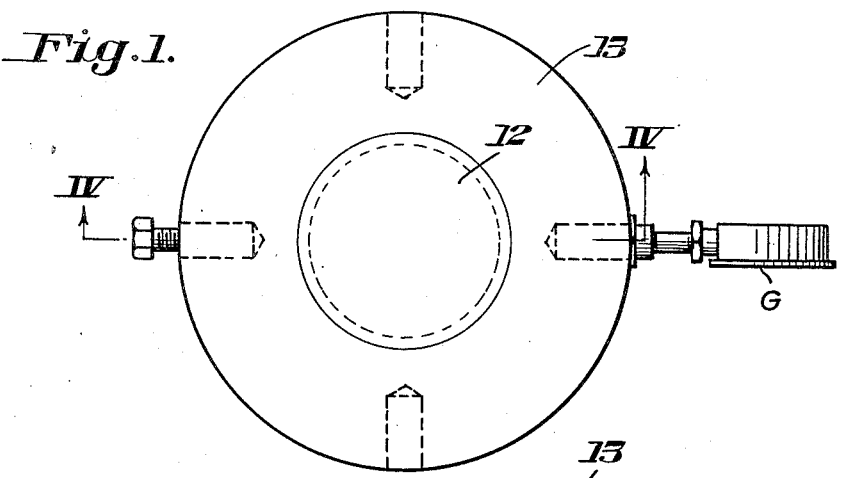
Figure 2:
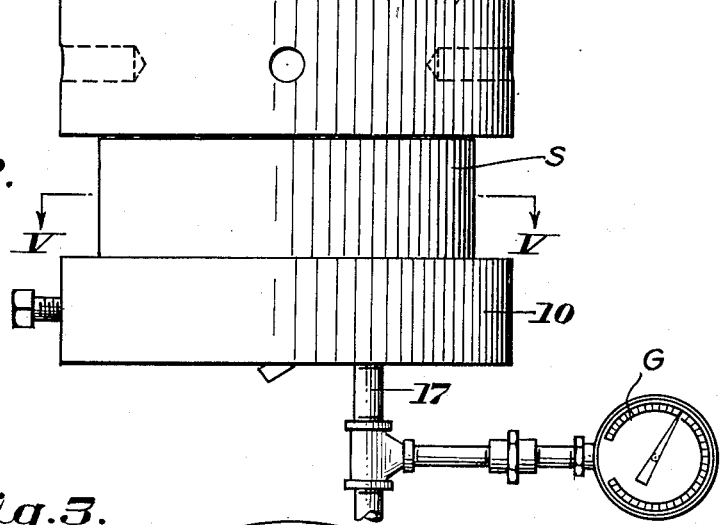
Figure 2 is a side elevation thereof.
Figure 3:
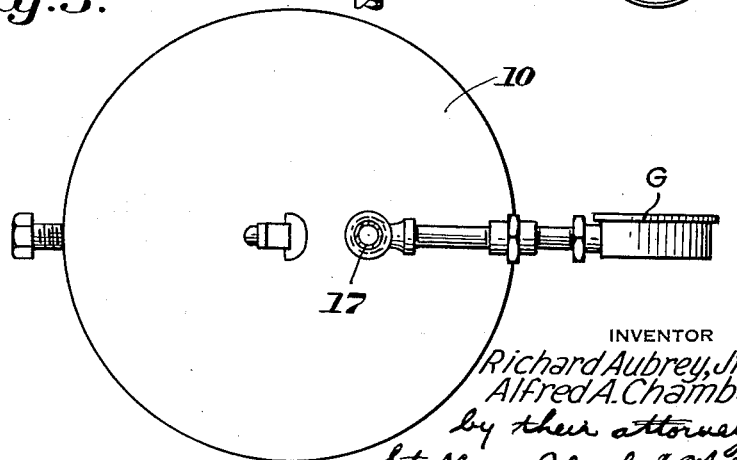
Figure 3 is a bottom plan view.

Referring in detail to the drawings and, for the present, to Figures 1 through 5, the apparatus there shown comprises a base 10 having a cylindrical block or stud 11 upstanding thereon. The base and stud may conveniently be formed by turning down a portion of the length of a cylindrical block, the initial diameter of which is substantially that of the base 10. The upper end of the block or stud 11 is reduced as at 12 and threaded to receive a nut 13. An expansible annulus 14 extends around the stud and rests on the base 10. The annulus may conveniently be a rubber ring of channel section having lips 15 extending inwardly from the edges of its flanges, adapted to make tight sealing engagement with the lateral surface of the block when pressure is admitted to the interior of the annulus.

A fluid supply passage 16 drilled into the base and block is adapted to communicate with the interior of the annulus. A pipe 17 threaded into an enlargement of the passage 16 communicates with a source of fluid, e. g., oil, under pressure such as a pump or accumulator. A gage G of any suitable type is tapped into the pipe 17 in order to indicate the pressure on the fluid within the annulus at all times. Air bleeder passages 18 are also drilled into the base and block. A tube 19 is threaded into the upper end of the passage 18 and extends into the upper portion of the space within the annulus for the purpose of venting air trapped therein. A needle valve 20 permits the bleeder passage to be closed when all the air has escaped from the annulus.

The manner of using the apparatus for performing our method will doubtless be apparent from the foregoing but will, nevertheless, be explained briefly. To perform a tension test on a ring-like specimen, the nut 13 is removed and the specimen indicated at S is telescoped onto the stud so it surrounds the annulus 14. There should be a relatively snug fit between the annulus and the specimen before fluid under pressure is admitted to the interior of the former. It will be apparent that the annulus may be made of any suitable dimensions, depending on the size of the specimen to be tested. The nut 13 is then threaded on the reduced upper end of the stud to hold the specimen in telescoped relation with the annulus. The nut is not turned down tight against the specimen, however, but a slight clearance is left therebetween to permit free radial movement of the specimen as it elongates under tension.

Fluid under pressure is admitted to the interior of the annulus through the pipe 17 and passage 16 under the control of a suitable valve (not shown). The needle valve 20 is opened to permit egress of the air within the annulus. When oil starts to flow out through the passages 19, the valve 20 is closed. Continued delivery of fluid under pressure to the interior of the annulus causes it to expand radially and stress the specimen circumferentially. The annulus, as shown, fits the block or stud 11 snugly. As a result, when the pressure builds up inside the annulus, the lips 15 thereof are forced tightly against the surface of the stud, thereby preventing any leakage of fluid. The annulus 14, of course, may be designed to permit the radial expansion thereof necessary to impart the desired stress to the specimen. Elongation of the latter may be noted by means of any suitable extensometer and a stress-strain curve plotted in the known manner to give the desired information as to the physical characteristics of the specimen.

After the specimen has been stressed beyond the yield point, the test may be continued to failure if it is desired to note the ultimate strength. In this case, suitable protection should be provided for operating personnel, because of the large amount of accumulated energy released instantaneously upon failure of the specimen. It will be understood that the stress applied to the specimen at any time may be readily determined from the formula $$P = \frac{2ST}{D}$$

where

P = hydrostatic pressure in lbs. per sq. inch gage.
S = transverse fibre stress in lbs. per sq. inch.
T = wall thickness (inches).
D = outside diameter (inches).

When the specimen has been tested to the desired limit, the pressure within the annulus is relieved, the nut 13 unscrewed and the specimen removed.

Figure 6 shows apparatus for subjecting a specimen to a compression test. This apparatus comprises a base 25 having a cylindrical wall 26 extending therefrom and defining therewith a cup or cylinder. An annulus 27 extends around the inside wall of the cylinder and is adapted to accommodate a cylindrical specimen S therein. The cylindrical wall 26 is threaded internally to receive a plug 28 which serves to hold the specimen and annulus in place. The plug, however, is not turned down tight against the specimen for the reason stated above. Fluid-supply passages 29 communicate with the interior of the annulus which is similar to that shown at 14. A pipe 30 extending from the passage 29 to a source of fluid under pressure has a pressure gage G tapped thereinto. Air bleeder passages 31 are controlled by a needle valve 32 as in the case of the tension-testing apparatus shown in Figures 1 through 5.

The apparatus of Figure 6 functions in the same manner as that of Figures 1 through 5 except that the admission of fluid under pressure to the annulus 27 causes it to expand radially inwardly thereby compressing the specimen circumferentially. The plug 28 has a shoulder 33 at the inner end thereof which projects inside the specimen to limit collapsing thereof after failure. The plug has a central bore 34 therethrough to admit an extensometer engaging the inner surface of the specimen.

It will be apparent from the foregoing that the invention is characterized by important advantages over previous apparatus and practice in the testing of pipe. In the first place, the invention permits accurate determination of the mechanical properties of the pipe in the transverse direction, without the error introduced by straightening a curved test piece before pulling it. By means of our invention, the test specimens are subjected solely to circumferential tension or to pressure and are free from the effect of longitudinal or other stresses which might throw off the accuracy of the test. The invention permits the quick determination of circumferential mechanical properties of pipe at low cost. Since only a short length of pipe is required, the cost of material which must be scrapped is negligible. It is thus feasible to increase the number of tests performed per ton of output which users of pipe are coming to insist upon.

Although we have illustrated and described but a preferred embodiment and practice of our invention, it will be recognized that changes in the construction and procedure disclosed may be made without departing from the spirit of the invention or the scope of the appended claims.

We claim:

1. Apparatus for testing a cylindrical test piece, comprising a base, an upwardly extending cylindrical stud on the base, said stud having a body portion and a reduced upper threaded portion, a nut on said threaded portion, an annular gasket of expansible material surrounding the body portion of said stud and lying entirely between and engaging the faces of said base and nut, and means for admitting fluid under pressure to the interior of said annular gasket.

2. Apparatus for testing a cylindrical test piece, comprising a base, an upwardly extending cylindrical stud on the base, said stud having a body portion and a reduced upper threaded portion, a nut on said threaded portion, an annular gasket of expansible material surrounding the body portion of said stud and lying entirely between and engaging the faces of said base and nut, the faces of said base and nut providing an annular space surrounding said annular gasket for receiving the cylindrical test piece, said faces being spaced apart a distance sufficient to allow free and unrestricted movement of said annular gasket and test piece in a radial direction, and means for admitting fluid under pressure to the interior of said annular gasket.

3. Apparatus for testing a cylindrical test piece, comprising a base, an upwardly extending cylindrical stud on the base, said stud having a body portion and a reduced upper threaded portion, a nut on said threaded portion, an annular gasket of expansible material surrounding the body portion of said stud and lying entirely between and engaging the faces of said base and nut, said annular gasket being of channel section and having lips extending inwardly from its flanges for engagement with the body portion of said stud, and means for admitting fluid under pressure to the interior of said annular gasket.

4. Apparatus for testing a cylindrical test piece, comprising a base, an upwardly extending cylindrical stud on the base, said stud having a body portion and a reduced upper threaded portion, a nut on said threaded portion, an annular gasket of expansible material surrounding the body portion of said stud and lying entirely between and engaging the faces of said base and nut, said annular gasket being of channel section and having lips extending inwardly from its flanges for engagement with the body portion of said stud, the faces of said base and nut providing an annular space surrounding said annular gasket for receiving the cylindrical test piece, said faces being spaced apart a distance sufficient to allow free and unrestricted movement of said annular gasket and test piece in a radial direction, and means for admitting fluid under pressure to the interior of said annular gasket.

5. Apparatus for testing a cylindrical test piece, comprising a base, a cylindrical stud on the base, a movable head spaced axially of the stud from the base, the faces of the base and head being spaced from each other to provide an annular space surrounding the stud, an annular gasket of expansible material surrounding the stud and lying entirely between and engaging the faces of the base and head, said faces being spaced apart a distance sufficient to allow free and unrestricted movement in a radial direction of said annular gasket and of a cylindrical test piece surrounding said gasket in said annular space, and means for admitting fluid under pressure to the interior of said annular gasket.

6. Apparatus for testing a cylindrical test piece, comprising a base, a cylindrical stud on the base, a movable head spaced axially of the stud from the base, the faces of the base and head being spaced from each other to provide an annular space surrounding the stud, an annular gasket of expansible material surrounding the stud and lying entirely between and engaging the faces of the base and head, said annular gasket being of channel section and having lips extending inwardly from its flanges for engagement with said stud, said faces being spaced apart a distance sufficient to allow free and unrestricted movement in a radial direction of said annular gasket and of a cylindrical test piece surrounding said gasket in said annular space, and means for admitting fluid under pressure to the interior of said annular gasket.

7. Apparatus for testing a cylindrical test piece, comprising a base, a hollow cylinder on the base, a movable head fitting within the cylinder and spaced from the base to provide an annular space within the cylinder, an annular gasket of expansible material lying entirely within said annular space between and engaging the faces of the base and head, said faces being spaced apart a distance sufficient to allow free and unrestricted movement in a radial direction of said annular gasket and of a cylindrical test piece located within said annular gasket, and means for admitting fluid under pressure to the interior of said annular gasket.

8. Apparatus for testing a cylindrical test piece, comprising a base, a cylindrical support on the base, a movable head spaced axially of the cylindrical support from the base to provide an annular space between the faces of the base and movable head, an annular gasket of expansible material lying entirely within said annular space between and engaging the faces of said base and movable head, said faces being spaced apart a distance sufficient to allow free and unrestricted movement in a radial direction of said annular gasket and of a cylindrical test piece located within said annular space and telescoping said annular gasket, and means for admitting fluid under pressure to the interior of said annular gasket.

9. Apparatus for testing a cylindrical test piece, comprising a base, a hollow cylinder on the base, a movable head fiitting within the cylinder and spaced from the base to provide an annular space within the cylinder, an annular gasket of expansible material lying entirely within said annular space between and engaging the faces of the base and head, said annular gasket being of channel section and having lips extending inwardly from its flanges for engagement with said hollow cylinder, said faces being spaced apart a distance sufficient to allow free and unrestricted movement in a radial direction of said annular gasket and of a cylindrical test piece located within said annular gasket, and means for admitting fluid under pressure to the interior of said annular gasket.

10. Apparatus for testing a cylindrical test piece, comprising a base, a cylindrical support on the base, a movable head spaced axially of the cylindrical support from the base to provide an annular space between the faces of the base and movable head, an annular gasket of expansible material lying entirely within said annular space between and engaging the faces of said base and movable head, said annular gasket being of channel section and having lips extending inwardly from its flanges for engagement with said cylindrical support, said faces being spaced apart a distance sufficient to allow free and unrestricted movement in a radial direction of said annular gasket and of a cylinder test piece located within said annular space and telescoping said annular gasket, and means for admitting fluid under pressure to the interior of said annular gasket.

RICHARD AUBREY, Jr.
ALFRED ALLEN CHAMBERS.

REFERENCES CITED

The following references are of record in the file of this patent:

UNITED STATES PATENTS

| Number | Name | Date |
| --- | --- | --- |
| 756,644 | Johnson | Apr. 5, 1904 |
| 1,222,817 | Sobraske | Apr. 17, 1917 |
| 1,788,845 | Reynolds | Jan. 13, 1931 |
| 2,314,310 | Jackson et al. | Mar. 16, 1943 |
| 2,360,276 | Redmond | Oct. 10, 1944 |

OTHER REFERENCES

Publication, "Detecting Distortion Caused by Pressure," by Zeebroeck, American Machinist, March 19, 1931, p. 476.